(12) United States Patent
Chaski

(10) Patent No.: US 9,880,995 B2
(45) Date of Patent: Jan. 30, 2018

(54) VARIABLES AND METHOD FOR AUTHORSHIP ATTRIBUTION

(76) Inventor: Carole E. Chaski, Georgetown, DE (US)

( * ) Notice: Subject to any disclaimer, the term of this patent is extended or adjusted under 35 U.S.C. 154(b) by 984 days.

(21) Appl. No.: 11/398,728

(22) Filed: Apr. 6, 2006

(65) Prior Publication Data

US 2007/0239433 A1    Oct. 11, 2007

(51) Int. Cl.
*G06F 17/27* (2006.01)
*G06F 17/30* (2006.01)

(52) U.S. Cl.
CPC ............ *G06F 17/27* (2013.01); *G06F 17/271* (2013.01); *G06F 17/2705* (2013.01); *G06F 17/2765* (2013.01); *G06F 17/2785* (2013.01); *G06F 17/30707* (2013.01)

(58) Field of Classification Search
CPC .... G06F 17/27; G06F 17/2705; G06F 17/271; G06F 17/2765; G06F 17/2785
USPC ....................................................... 704/1–10
See application file for complete search history.

(56) References Cited

U.S. PATENT DOCUMENTS

| | | | | |
|---|---|---|---|---|
| 5,182,708 | A * | 1/1993 | Ejiri .................................. | 704/1 |
| 5,799,268 | A * | 8/1998 | Boguraev ......................... | 704/9 |
| 6,473,752 | B1 * | 10/2002 | Fleming, III ..................... | 707/4 |
| 6,473,753 | B1 * | 10/2002 | Katariya et al. .................. | 707/4 |
| 6,640,145 | B2 * | 10/2003 | Hoffberg et al. ................ | 700/83 |
| 6,963,839 | B1 * | 11/2005 | Ostermann et al. .......... | 704/260 |
| 7,088,949 | B2 * | 8/2006 | Burstein et al. .............. | 434/353 |
| 7,137,070 | B2 * | 11/2006 | Brown et al. .................. | 715/744 |
| 7,233,891 | B2 * | 6/2007 | Bond et al. ....................... | 704/9 |
| 7,296,015 | B2 * | 11/2007 | Poltorak .......................... | 707/5 |
| 2002/0052730 | A1 * | 5/2002 | Nakao ............................. | 704/10 |
| 2004/0078192 | A1 * | 4/2004 | Poltorak .......................... | 704/9 |
| 2007/0260448 | A1 * | 11/2007 | Lorenzen et al. ................ | 704/1 |

OTHER PUBLICATIONS

Kim Luyckx, Walter Daelemans, "Shallow Text Analysis and Machine Learning for Authorship Attribution", Proceedings of the Fifteenth Meeting of Computational Linguistics in the Netherlands, 2005.*

E. Stamatatos, N. Fakotakis, G. Kokkinakis, "Computer-Based Authorship Attribution Without Lexical Measures", Computers and the Humanities, 2001.*

H. Baayen, H. van Halteran, A. Neijt, F. Tweedie, "An Experiment in Authorship Attribution", Journes internationales d'analyse statistique des Donnes Textuelles 6, 2002.*

(Continued)

*Primary Examiner* — Eric Yen
(74) *Attorney, Agent, or Firm* — James M. Lennon

(57) ABSTRACT

A method uses linguistic units of analysis to identify the authorship of a document. The method is useful to determine authorship of brief documents, and in situations where there are less than ten documents per known author, i.e. when there is scarcity of text. The method analyzes parameters such as the syntax, punctuation, and, optionally the average word and paragraph length, and when the parameters are analyzed using statistical methods, obtains a high degree of reliability (>90% accuracy). The method can be applicable to numerous languages other than English because the variables selected are characteristic of most languages. The reliability of the method is verified when subjected to a cross-validation statistical analysis.

2 Claims, 5 Drawing Sheets

(56) References Cited

OTHER PUBLICATIONS

David I. Holmes, "Authorship Attribution", Computers and the Humanities, 1994.*

Andreas Kaster, Stefan Siersdorfer, Gerhard Weikum, "Combining Text and Linguistic Document Representations for Authorship Attribution", Workshop Stylistic Analysis of Text for Information Access, 28th International SIGIR, 2005.*

Emmerich Kelih, Gordana Antic, Peter Grzybek, Ernst, Stadlober, "Classification of Author and/or Genre? The Impact of Word Length", Heidelberg: Springer, 2005.*

* cited by examiner

| | |
|---|---|
| 100 | Enter Document Into System |
| 110 | Split Text of Document Into Constituent Sentences |
| 122 | Categorize Each Punctuation Mark Within Each Sentence: |
| 122 | Determine Syntactic Edges:<br>    Edge-of-Sentence ("EOS");<br>    Edge of Clause ("EOC");<br>    Edge of Phrase ("EOP"); and<br>    Edge of Morpheme ("EOM") |
| 124 | Determine Graphemic Features Which Indicate Discursive Function<br>    Emphatics ("EMPH") |
| 130 | Split Each Sentence Into Constituent Words |
| 132 | Label Each Word as to its Part-Of-Speech ("POS", Table 5) |
| 134 | List Combinations of Words into Phrases For Each Word |
| 136 | List Phrases For Each Head<br>    Subtypes:<br>        Marked<br>        Unmarked |
| 138 | Characterize Phrases By Markedness |
| 140 | Count Number of Subtypes:<br>    Seventeen (17) Variables/Features |
| 150 | Analyze By Statistical Procedures<br>    Sentence Level Analysis<br>    Document Level Analysis |

150 Analyze By Statistical Procedures

152 Input Variables/Features:

A. Syntactic Variables/Features
        1) Full Version of Marked/Unmarked Syntax
        uAP; mAP; uCONJ; mCONJ; uDP; mDP; uMP;
        mMP; uNP; mNP; uPP; mPP; uVP; mVP; Subn; N-PRO;
        INTJ 2) XP Version
            uXp; mXP 3) NOM Version
            NOM, PRED, COMP, MOD B. Graphemic Variables/Features EOS; EOC; EOP; EOM; EMPH:
        Clausal; SubClausal C. Stylometric Variables/Features .
        Average Word Length      (AVGWL)
        Average Paragraph Length  (AVGPL, only for document
                                            level analysis)

154 Determine Whether Document Author is a Known Author in Group

Fig. 4

VARIABLES AND METHOD FOR AUTHORSHIP ATTRIBUTION

STATEMENT REGARDING FEDERALLY SPONSORED RESEARCH OR DEVELOPMENT

Some of the work in this application was supported by grants 95-IJ-CX-0012 and 98-LB-VX-0065 from the National Institute of Justice, Office of Justice Programs, United States Department of Justice. Points of view in this document are those of the author and do not represent the official position of the U.S. Department of Justice. The federal government may have an interest in this application.

CROSS-REFERENCES TO RELATED APPLICATIONS

This application claims the benefit of U.S. Provisional Application Ser. No. 60/668,004, filed on 4 Apr. 2005, the contents of which are incorporated by reference herein in their entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

This invention relates to the field of determining the authorship of documents, by analyzing the structure of the language (i.e., the syntax, discourse and punctuation) used within the document. The method employed herein can be used to determine authorship of short textual works as well as more lengthy works such as a book, manuscript or the like, and can be utilized in a forensic setting.

BACKGROUND OF THE INVENTION

Introductory material is presented in this section, relating (A) specific principles guiding language-based authorship attribution within the forensic setting; (B) general principles of authorship attribution as a pattern-recognition problem; (C) background information in authorship attribution, including variables, methods and results of others, and (D) principles of syntax, markedness and part-of-speech tagging which underlay embodiments of the present invention.

A. Language-Based Authorship Attribution in the Forensic Setting.

During the course of criminal investigations, documents come to light whose authorship is uncertain but yet can be legally significant. Authorship determination is important in situations such as: a ransom note in a kidnaping; a threatening letter; anonymous letters; suicide notes; interrogation and/or interview statements; locating missing persons; employment disputes; examination fraud; plagiarism; will contests; peer review of reports in various other situations; and other contested issues of authorship. In view of the current focus on terrorism and the search for persons involved in terrorist acts, making terroristic threats, or kidnaping of citizens, the determination of authorship also plays a significant role.

While in the past these documents were generally handwritten, increasingly they are being produced with the aid of computers and printers, over electronic networks, or on printers or copiers, thus precluding the use of "standard" document analysis, which has typically focused on handwriting analysis, or analysis of the imprints of typewriter keys. In situations involving printed, electronically-produced or facsimile transmitted, rather than hand-written documents, the linguistic features of the document become important factors for determining the authorship of the document.

In contrast to handwriting examination or typewriter analysis, language-based authorship attribution relies on linguistic characteristics as variable sets for differentiating and identifying authors. In the literature on authorship attribution, there are four linguistic-variable classes which have been used by others and are sometimes combined with each other. These linguistic-variable classes are: (1) lexical, (2) stylometric, (3) graphemic, and (4) syntactic.

Lexical variables include vocabulary richness and function word frequencies; (function words in English are a closed set of words which specify grammatical functions, such as prepositions, determiners and pronouns).

Stylometric variables include word length, sentence length, paragraph length, counts of short words, and such.

Graphemic variables include the counts of letters and punctuation marks in a text.

Syntactic variables include the counts of syntactic part-of-speech tags such as noun, verb, etc., and adjacent part-of-speech tags.

As will be shown in the specification, and defined by the claims, new linguistic-variable sets are defined within these classes, and which variable sets are specifically applicable to authorship attribution in the forensic and non-forensic settings.

Authorship attribution in the forensic setting must meet certain criteria in order to be admitted as scientific evidence or entertained seriously as investigative support. In *Daubert v. Merrill-Dow Pharmaceuticals, Inc.,* 509 U.S. 579, 27 USPQ2d 1200 (1993), the Supreme Court set out guidelines which substantially changed the admissibility of scientific evidence within the federal court system, and which have become applicable in a number of state court jurisdictions as well. The criteria described herein are not those described in *Daubert,* but those that this inventor believes should guide the development of an authorship identification method, and which will later insure the admissibility of such evidence. Accordingly, these criteria are linguistic defensibility, forensic feasibility, statistical testability, and reliability.

First, the method must be linguistically defensible. Basic assumptions about language structure, language use, and psycholinguistic processing should undergird the method. The linguistic variables which are ultimately selected should be related in a straightforward way to linguistic theory and psycholinguistics; the linguistic variables should be justifiable. For example, function words have been used in many lexical approaches to authorship attribution, perhaps most famously by Mosteller and Wallace (1984). Function words can be justified as a potential discriminator for two reasons: first, function words are a lexical closed class, and second, function words are often indicators of syntactic structure. Psycholinguistically, function words are known as a distinct class for semantic processing and the syntactic structures which function words shadow are known to be real. A method based on function words is linguistically defensible because there is a fairly obvious way for a linguist to relate this class of discriminators to what we already know about language structure and psycholinguistic processing.[1]

[1] However, function words may not be the most direct way to access the linguistic knowledge and behavior which function words apparently reflect.

Second, the method must be forensically feasible. Specifically, a forensically feasible method must be sensitive to the actual limitations of real data and the basis of expert opinion. Foremost, the method must be designed to work within the typical forensic situation of brevity and scarcity of texts. The importance of this criterion can not be ignored because forensic feasibility will impact both the selection of linguistic variables as well as the selection of statistical procedures. Many of the lexical approaches which have been developed within literary studies have rightfully exploited the lexical richness and high word counts of such literary data, but these same approaches are not forensically feasible because the typical forensic data is too short or too lexically restricted. Further, statistical procedures which require hundreds of cases to fit a large number of variables are not always forensically feasible because in the typical forensic situation there are not hundreds of texts to be analyzed. Due to the scarcity of texts, either the texts can be separated into smaller units to provide additional cases or the linguistic variables can be collapsed. But in either text-decomposition or variable-reduction, again linguistic defensibility must be maintained. For example, it was once suggested that split-half reliability testing be performed at the word level: every other word of a document was extracted and that extracted portion was tested against the remainder of the original document (Miron 1983). While this kind of text-decomposition is understandable as a way of dealing with the scarcity of texts, this particular technique is linguistically indefensible because, by relying on a basic assumption that language is just a "bag of words" rather than a structured system, the approach totally ignores the fact that there is a linearized and syntactic structure in text which is psychologically real to the author of the document.

Another impact of the forensic feasibility criterion concerns the basis of expert opinion. In the forensic setting, the expert witness stakes his or her reputation on the accuracy of the data analysis. Therefore, any "black box" methods which are automatized to the extent that the analyst cannot supervise, error-correct or otherwise intervene in the basic data analysis may not be acceptable to forensic practitioners or linguists who do not wish to serve as mere technician-servants of the machine. On the other hand, automatization of many types of linguistic analysis provides a welcome way to avoid examiner bias and fatigue. The best approach, therefore, appears to be an interactive, user-assisted automatic computerized analysis, since the machine can provide objective, rule-based analysis and the human can correct any analytical errors the machine might make.

Third, the method must be statistically testable. Specifically, this criterion requires that the linguistic variables—even if they are categorical—can be operationally defined and reproduced by other linguists. This criterion does not reject categorical linguistic variables which may have their basis in qualitative analysis, but it does reject subjective reactions to style such as "sounds like a Clint Eastwood movie" or "not what a blue-collar worker would write". These quotations are not facetious, but actual comments from experts whose reports this inventor has read.

Fourth, the method must be reliable, based on statistical testing. The level of reliability can be obtained through empirical testing. Naturally, the most accurate method is most welcome in the forensic setting, but even a method with an empirically-based, statistically-derived overall accuracy rate of only 85% or 90% is better than any method whose reliability is unproven, untested, anecdotal or simply hypothesized and then stated as accomplished fact.

If an authorship attribution method meets these scientific criteria, it will surely meet success within the legal arena under the Daubert-Joiner-Kumho criteria. Linguistic defensibility speaks to general acceptance among peers; linguists are certainly far more likely to accept any method which is based on standard techniques of linguistic theory as well as conceptions of language congruent with linguistic theory and psycholinguistic experimentation than one based on prescriptive grammar or literary sensibility. Forensic feasibility speaks to the appropriate application of the method to typical forensic data and the credibility of the testimony. Finally, both statistical testing and reliability speak to the error rate, and again, the credibility and weight of the testimony.

Given these criteria for developing a forensic method of determining authorship, many current proposals or methods are eliminated. For instance, vocabulary-richness methods requiring texts of more than 1000 words cannot be met within the typical forensic situation; there is simply not enough data in forensically-relevant texts. Error analysis looks for errors in punctuation, spelling and word usage, based on the assumption that errors are idiosyncratic, and that the configuration of errors possessed by one person is a characteristic of that individual. However, errors are often so rare that they do not occur with enough frequency to be statistically testable (Koppel and Schler 2003; Chaski 2001). Syntax-based proposals are more promising, because every text contains phrases which contain syntactic structures, but some types of syntactic structures require more data than is forensically feasible.

The linguistic variables and method set forth in this application are defensible in terms of linguistics as a science, are forensically feasible because they can work on short texts, have been statistically tested and have been found to be reliable.

B. Authorship Attribution as a Pattern-Recognition Problem.

Authorship attribution is a pattern recognition problem. In any pattern recognition problem, the basic task is to determine the optimal fit between feature sets and algorithms. The interaction between features and classification procedures is an intricate dance that can only be completely understood through empirical testing. As in any pattern recognition problem, these two sides to the solution have to work together. The first side is the variables which quantify the textual data, and the second side is the algorithm which classifies the variables. The optimal solution consists of a variable set matched with a classification algorithm to achieve a correct attribution, as shown in FIG. 1, illustrating the Variable Sets being processed by Classification Algorithms which produce accuracy results through standard statistical methods.

The classification algorithms used with these variables sets are standard procedures, including discriminant function analysis, logistic regression, decision trees, and support vector machines. Any of these methods create a model based on training data and then test the model by predicting the correct author of a new document.

When small amounts of data are available, which is typically the situation in forensic authorship attribution, those skilled in the art in pattern-recognition problems utilize a cross-validation technique. Cross-validation is a way of testing how good the model is, based on all the data that is available. For example, in "leave-one-out" ("LOO") cross-validation, one data row is left out during the model-building and its membership is predicted; it is then put back into the model-building, while the next data row is left out and its membership is predicted. Other cross-validation schemes are available, such as four-fold or ten-fold (where one-fourth or one-tenth of that data, respectively is left out for model-building and so forth).

Accuracy results include how many times the left-out documents are classified to the correct author, as well as how many times a new document is classified to the correct author when the model is tested. Since each classification algorithm has different assumptions and requirements for the data, any of these algorithms can be used with the variable sets described within the present invention if enough textual data which meets the requirements of the algorithm(s) is available.

Aspects of the pattern-recognition approach to authorship attribution are known. Generally, rather than focusing on the handwriting of the document, this language-based, pattern-recognition approach to determining the authorship of a document, or other textual work, such as a book, manuscript, or the like, involves the steps of tagging the documents for linguistic characteristics, counting the tags, and statistically testing the counts through a classification procedure. Within this paradigm, the methods differ in terms of the linguistic-variable sets employed, the classification algorithms and their overall accuracy results.

For example, recent studies in this paradigm such as those of Stamatatos et al. (2001), Baayen et al. (2002), Chaski (2004) and Tambouratzis et al. (2004) have examined lexical, syntactic and punctuation variables with discriminant function analysis, one of several statistical procedures for classifying and predicting group membership. As shown by these studies, combining different types of features (e.g. lexical with punctuation, or lexical, punctuation and syntactic) improved performance for the discriminant analysis. These studies provide some support for and are consistent with earlier findings that syntax and punctuation, in general, can reliably distinguish authors (Chaski 2001).

Discriminant function analysis consistently performs well as a classification procedure for authorship attribution. Baayen et al. (2002) demonstrated that discriminant analysis performed much better in their authorship attribution experiment than principle components analysis. In earlier work, Stamatatos et al. (2000) showed that discriminant analysis performed better than multiple regression at classifying documents by author and genre.

This application addresses the task of achieving feature-algorithm optimality within the forensic setting. Thus, the present application is directed towards the variable sets used to quantify the textual data, and a method and system for obtaining cross-validation in the classification algorithms.

This inventor has developed variable sets which can be used with several available classification algorithms and different amounts of textual data, using discriminant function analysis, logistic regression, decision trees, and support vector machines. Consequently, the best accuracy results are being obtained using the variable sets which are described herein with discriminant function analysis, decision trees and logistic regression (results are reported in Section C). Embodiments of the present invention employ, in contrast to known methods, both sentence-level and document-level data for use with the classification algorithms.

Embodiments of the present invention utilize cross-validated classification algorithms with sets of variables comprising syntactic and graphemic features, illustrating that in contrast to previous methods, the method described herein has an overall accuracy rate of 95%.

C. Prior Art Methods in Authorship Attribution in Contrast to Specification.

This section reviews work by Stamatatos et al. (2001), Tambouratzis et al. (2004) and Baayen et al. (2002). These studies illustrate the use of linguistic-variables in the pattern-recognition paradigm, and they are in general similar to the specification, but they each differ fundamentally from the invention/specification in two ways. First, each of these studies uses standard, well-known linguistic variables which are different from the linguistic-variables sets specified in the invention/specification. Second, each of these studies uses standard, well-known cross-validation procedures for document-level data, which are different from the cross-validation procedure in the invention/specification. This section concludes with a brief summary of experimental results using the invented variables and method demonstrating that the invention has achieved higher accuracy rates than previously obtained in prior art.

Stamatatos et al. (2001) demonstrated that a totally automated analysis using syntactic and lexical variables obtains an accuracy rate ranging from 74% to 87%. The corpus consisted of 30 texts for each of 10 authors, newspaper columnists writing on a range of topics including biology, history, culture, international affairs and philosophy. The texts ranged in word length from less than 500 words to more than 1,500 words. In total, the corpus contained 333,744 words. Twenty texts of each author were used to train a linear discriminant function analysis; the remaining ten texts of each author were then classified according to the closest Mahalonobis distance from each of the groups' centroids.

The linguistic variables used in the linear discriminant function analysis included 50 lexical features and 22 syntactic features. The lexical features were the frequencies of the 50 most frequent words in the training texts normalized for text-length. Using these 50 lexical features, the average (or overall) accuracy (or correct classification) was 74%. The syntactic features included sentences/words (average sentence length), punctuation marks/words, detected versus potential sentence boundaries, length of phrasal chunks for noun, verb, adverb, preposition and conjunction, and information about parsing such as the number of words untagged for part-of-speech after a number of passes. None of the linguistic variables used by Stamatatos et al. (2001) are the same as the syntactic or graphemic variables described in embodiments of the present invention.

Using the 22 syntactic features, the average accuracy was 81%. When the lexical and syntactic features were combined into a 72-feature set, the highest accuracy rate of 87% was obtained. Most of the lexical variables are frequencies of Modern Greek function words (determiners, prepositions, pronouns, complementizers and so forth). Given that function words often shadow syntactic structure, the accuracy result may actually be due to the underlying syntactic structure signaled lexically. But what is especially interesting in Stamatatos et al.'s study is that direct syntactic measures improve on the accuracy rate based on the lexical measures.

In stated contrast to Stamatatos et al.'s work, Tambouratzes et al. (2004) focused on determining authorship within one register (as defined by general topic). Transcripts of speeches delivered in Greek Parliament by five parliament members over the period 1996-2000 were extracted from a record prepared by the Greek Parliament Secretariat. The speeches ranged in length from less than 300 words to more than 5,000 words. With over 1,000 texts, the total corpus consisted of 1,292,321 words. The corpus for each speaker ranged in size from 463,680 words for Speaker A to 177,853 words for Speaker B. Further, the number of speeches given by each speaker ranged from 418 for Speaker A to 85 for Speaker B. Speakers C, D, and E's total number of speeches and total word count of speeches fell between the maximum of Speaker A and minimum of Speaker B.

Several variable sets of 46, 85, and 25 features were used for linear discriminant analysis. These sets included both lexical and syntactic variables. Lexical variables consisted of specific words. Syntactic variables included part-of-speech (POS) tags and morphological inflections, where POS includes noun, verb, adjective, adverb, and so forth. Other variables included word and sentence length as well as punctuation marks, and information about parsing, such as the number of tokens unidentified by the tagger. A forward stepwise discriminant analysis with 85 variables indicated that only 25 variables were actually used to generate the classification. The 25 variables included lexical, stylometric, syntactic and punctuation information. Lexical variables included frequencies of specific words (one, me, mister). Stylometric variables included average number of letters per word (word length). Syntactic variables included frequencies of adverbials, conjunctions, verbs, articles and other parts-of-speech. Punctuation variables included the frequencies of dashes and question marks. The combination of features used by Tambouratzes et al. (2004) is not the same as the syntactic or graphemic variables described in embodiments of the present invention.

Leave-one-out as well as ten-fold cross-validation was selected with discriminant function analysis. The average cross-validated accuracy rate for the five speakers, using the 85-variable set, and texts of any length was 85%. Speaker A's speeches were the most correctly classified at 92.3%, while Speaker F's speeches were the most difficult to classify with an accuracy rate of 78.3%. When the cases were restricted to speeches at least 500 words long, the accuracy rate improved to 89%. But now Speaker D's speeches obtained the highest accuracy rate at 93.7%, (Speaker A's rate having fallen to 90%), and the speeches of Speaker F were still the most difficult to classify at an accuracy rate of 83.3%.

Baayen et al. (2002) demonstrated that lexical and punctuation variables, using nine texts per author on two versions of discriminant function analysis ("DFA") and two versions of cross-validation, obtain cross-validated accuracy rates from 49% to 88%. Baayen et al's (2002) experiments used eight "naive writers," i.e. first- and fourth-year college students who wrote three texts in three genres (fiction, argument and description). The students were specifically asked to write texts of around 1000 words. The 72 texts' average length was 908 words, so the total corpus can be estimated at approximately 65,000 words.

When only the lexical, function word variables were included and the cross-validation procedure included texts of all three genres, the standard pairwise discriminant function analyses resulted in an overall accuracy rate of 49%. When the cross-validation procedure was modified so that the genre of the holdout (or left-out) text was matched by the validation texts, the overall accuracy rate improved to 79%. Under the same modification to cross-validation, when the standard discriminant function analysis was enhanced by weighting the vectors by the entropy of the words (so that novel words across texts weigh more than redundant words), the overall accuracy increased to 82%.

The frequencies of eight punctuation marks constituted the punctuation mark variables. When these punctuation mark variables were added to the lexical function word variables, with the modified cross-validation procedure and the entropy-enhanced discriminant function analysis, the overall accuracy for the 28 author-pairs increased to 88%. None of the punctuation features used by Baayen et al. (2002) are the same as the syntactic or graphemic variables employed in embodiments of the present invention.

Table 1 summarizes the three studies described above.

TABLE 1

Summary of Recent Authorship Attribution Cross-Validation Results

| | Study | | |
|---|---|---|---|
| | Stamatatos | Tambouratzis | Baayen |
| Language | Modern Greek | Modern Greek | Dutch |
| Authors | 10 | 5 | 8 |
| Number of Texts | 30 | 1000 | 72 |
| Total Wordcount | 333,744 | 1,292,321 | ~65,000 |
| Statistical Procedure | Linear DFA[a] | Linear DFA | Linear DFA and entropy-enhanced DFA ("EDFA") |
| Features | Lexical, Syntactic & Punctuation | Lexical, Syntactic & Punctuation | Lexical & Punctuation |
| Best Overall Accuracy Rates | 87% | 89% | LDFA: 57% EDFA: 88% |
| Authors' Range of Accuracy Rates | unreported | 94%-83% | unreported |

[a]DFA = discriminant function analysis.

Some of the differences between the prior art methods described above (Table 1) and embodiments of the present invention include:

1. no lexical variables, i.e., no specific words, function words or word frequencies, are used in the present invention.

2. syntactic variables based on the combinatoric markedness of the parts-of-speech are used in the present invention, not counts of specific parts-of-speech.

3. graphemic variables based on the syntactic edges to which punctuation marks attach are used in the present invention, not counts of specific punctuation marks.

4. embodiments of the present invention allow for sentence-level data, as well as document-level data, to be used for model-building, not only document-level data.

5. embodiments of the present invention allow for sentence-level data for model-building and document-level cross-validation (called LODO cross-validation, detailed in the specification).

6. an embodiment of the present invention specifies a method of reducing the number of linguistic variables based on the markedness contrast, so that fewer documents can be used. (Markedness will be defined and discussed in Section D).

7. an embodiment of the present invention specifies a method of reducing the number of linguistic variables based on the nominal/predicative contrast, so that fewer documents can be used. (The nominal/predicative contrast will be defined and discussed in Section D).
8. an embodiment of the present invention specifies a set of part-of-speech tags which are the building blocks for the combinatoric markedness of phrases.

Both markedness and the nominal/predicative contrast will be defined and discussed in Section D: Background Information on Syntax, Markedness and Part-Of-Speech Tagging.

The basis of the present invention is that individuals focus more attention to meaning than to form. The formal combination of words into syntactic structures is both so habitual and so variable that it cannot be easily imitated or adopted by others, and therefore these highly individualized and unconsciously created patterns enable different authors to be reliably distinguished from each other.

Thus, by focusing on those features of language that are highly unconscious and individualizable one can seek to identify the author of a work such as a document, using these features with an appropriate classification procedure.

Experimental results (described below and in the Detailed Description of the Invention section) demonstrate that an embodiment of the present invention achieves higher accuracy results than those obtained in prior art methods.

In this example, ten authors were drawn from Chaski's Writing Sample Database, a collection of writings on particular topics designed to elicit several genres such as narrative, business letter, love letter and personal essay (Chaski 1997, 2001). The ten authors are five women and five men, all white adults who have completed high school up to three years of college at open-admission colleges. The authors range in age from 18 to 48. The authors all have extensive or lifetime experience in the Delmarva (Delaware, Maryland, Virginia) dialect of the mid-Atlantic region of the United States. The authors are "naive writers" (in terms of Baayen et al. 2002) with similar background and training. The authors volunteered to write, wrote at their leisure, and were compensated for their writings through grant funding from the National Institute of Justice, US Department of Justice.

The authors all wrote on similar topics, listed in Table 2.

TABLE 2

Topics in the Writing Sample Database

| Task ID | Topic |
| --- | --- |
| 1. | Describe a traumatic or terrifying event in your life and how you overcame it. |
| 2. | Describe someone or some people who have influenced you. |
| 3. | What are your career goals and why? |
| 4. | What makes you really angry? |
| 5. | A letter of apology to your best friend |
| 6. | A letter to your sweetheart expressing your feelings |
| 7. | A letter to your insurance company |
| 8. | A letter of complaint about a product or service |
| 9. | A threatening letter to someone you know who has hurt you |
| 10. | A threatening letter to a public official (president, governor, senator, councilman or celebrity) |

In order to have enough data for the statistical procedure to work, but in order to make this experiment as forensically feasible as possible, the number of documents for each author was determined by however many were needed to hit targets of approximately 100 sentences and/or about 2,000 words. One author needed only 4 documents to hit both targets, while two authors needed ten documents. Three authors needed 6 documents to hit the sentences target but only one of these three exceeded the words target. The exact details are shown in Table 3: Authors and Texts.

TABLE 3

Authors and Texts

| Race, Gender | Topics by Task ID | Author ID Number | Number of Texts | Number of Sentences | Number of Words | Average Text Size (Min, Max)[a] |
| --- | --- | --- | --- | --- | --- | --- |
| WF[b] | 1-4, 7, 8 | 16 | 6 | 107 | 2,706 | 430 (344, 557) |
| WF | 1-5 | 23 | 5 | 134 | 2,175 | 435 (367, 500) |
| WF | 1-10 | 80 | 10 | 118 | 1,959 | 195 (90, 323) |
| WF | 1-10 | 96 | 10 | 108 | 1,928 | 192 (99, 258) |
| WF | 1-3, 10 | 98 | 4 | 103 | 2,176 | 543 (450, 608) |
| WF Total | | | 35 | 570 | 10,944 | |
| WM[c] | 1-8 | 90 | 8 | 106 | 1,690 | 211 (168, 331) |
| WM | 1-6 | 91 | 6 | 108 | 1,798 | 299 (196, 331) |
| WM | 1-7 | 97 | 6 | 114 | 1,487 | 248 (219, 341) |
| WM | 1-7 | 99 | 7 | 105 | 2,079 | 297 (151, 433) |
| WM | 1-7 | 168 | 7 | 108 | 1,958 | 278 (248, 320) |
| WM Total | | | 34 | 541 | 9,012 | |
| Grand Total | | | 69 | 1,111 | 19,956 | |

[a] (Min, Max) = Minimum, Maximum
[b] WF White, Female.
[c] WM White, Male

Authors are compared to each other in pairs. Comparing two authors at a time gets better results than comparing multiple authors. That is, higher accuracy rates for distinguishing the documents of different authors and assigning documents to the correct author are obtained with pairwise author testing.

Table 4 shows the performance of some of the proposed linguistic-variable sets with available classification algorithms using commercially available software, SPSS (Statistical Package for the Social Sciences, SPSS Inc., Chicago. Ill.). These proposed linguistic-variable sets enable these classification algorithms to achieve higher accuracy rates than have been previously reported in the literature (as summarized above, Table 1).

TABLE 4

Accuracy Rates Using Syntactic Analysis and Variable Sets

| Exp[a] | Variable Sets | Textual Units (for counts of variables) | Classification Algorithm | Overall Accuracy |
|---|---|---|---|---|
| 1. | 1 | Sentences, Mean of Document | Linear DFA[b] using LODO[c] cross-validation | Opposite Sex Pairs: 98% All Pairs: 91% |
| 2. | 2 | Document | Linear DFA | 95% |
| 3. | 3 | Document | Linear DFA | 91% |
| 4. | 7 | Document | Logistic Regression | 96% |

[a]Exp = Example Experiment
[b]DFA = discriminant function analysis.
[c]LODO = leave one document out Similar results have also been obtained using decision trees (in the commercially available software DTREG, available from its author through www.dtreg.com) and support vector machines (in the open source software LNKNET, from the Lincoln Laboratory, MIT, Cambridge, Mass.)

D. Background Information on Syntax, Markedness and Part-of-Speech Tagging.

Some basic ideas about syntax and markedness are presented here to assist one's understanding of this application. Part-of-speech tagging schemes are described so that the part-of-speech tagging scheme of the present invention can be distinguished and identified. The combination of these ideas has never been applied to authorship attribution to the best of the inventor's knowledge. Embodiments of the present invention utilize new variables for linguistically characterizing a text for authorship testing.

Syntax is the study of the possible combinations of word units into grammatical phrases. Grammatical combinations are also known as constituent structures since they are structures which are constituted of smaller structures and units. Discourse is the study of how sentential units are combined and how communicative effect is conveyed (e.g. how we recognize irony, agreement and other rhetorical effects).

In elementary school and foreign language instruction, one learns that there are different types of words which differ because they function in different ways. For instance, nouns label objects, persons, places and ideas and, in English, nouns follow other types of words such as determiners and adjectives. In grammar that is used for teaching purposes, words are thus classified into "parts-of-speech" ("POS") categories.

In the concept of generative grammar, words are classified into two main categories, major and minor. Word types in the major categories can combine with other words to create phrases which function like single word units. For instance, noun is a major category because combined phrasal unit "the beautiful tables" can function just like the single word unit "tables." To illustrate this, compare the two sentences: "he bought tables at auction" and "he bought the beautiful tables at auction."

Major categories are known as "heads" because they "head up" phrases when they combine with other words. Word types in minor categories combine with other words, but when minor word types combine their word type does not dominate the other words in the phrase or "head up" the phrase.

Within the major and minor categories, the POS categories are defined much as in school grammars, and described below.

MAJOR:
Noun: names person, place or thing (abstract or concrete). Pronouns replace nouns; they are like proper nouns.
Verb: names action or state-of-being.
Adjective: describes nouns or state-of-being.
Preposition: names relationship between noun-noun or verb-noun, usually spatial or temporal relation (on, over, above, beyond).

MINOR:
Determiners: specify nouns (the, a, this, those, that). Possessive pronouns are like determiners because they are very specific.
Complementizers: introduce embedded clause (that, for, whether, if).
Adverbs: specify the action/states named by verbs or act as intensifiers for the degree of an adjective (hardly, very); also known as Modifiers.
Particles: look like prepositions and are similar to adverbs, they specify verbs, but unlike adverbs (which are always modifiers) particles are required in certain verbs (look up, pick up, throw up, look down on, throw over).
Conjunction: conjoin phrases and sentences (and, but).

In generative grammar, the concept "head of the phrase" (also known as headedness) is structurally very important. The head of a phrase is the word which gives its function to the entire phrase. A phrase is a single word or combination of words which conveys a unit of information. For example, in the phrase "the alleged conspirator", "the" (a determiner) specifies a particular person, "alleged" (an adjective) describes a state-of-being, and "conspirator" (a noun) labels a particular person. Since the entire group of words, "the alleged conspirator" also labels a particular person, the head of this phrase is "conspirator" a noun, and the phrase is designated as a noun phrase ("NP").

The following series of phrases explains this nomenclature, wherein below each sentence the words therein are identified by their parts-of-speech.
(1) Tables
    NOUN
(2) The tables
    DETERMINER NOUN
(3) The antique tables
    DETERMINER ADJECTIVE NOUN
(4) The antique tables which you found
    DETERMINER ADJECTIVE NOUN RELATIVIZER PRONOUN VERB
(5) The antique tables for your sister
    DETERMINER ADJECTIVE NOUN PREPOSITION PRONOUN NOUN
(6) The antique tables to give to Charlie
    DETERMINER ADJECTIVE NOUN VERB PREPOSITION NOUN All of these phrases are headed by a noun "tables" because the phrases (2) through (6) could stand in the same place as the phrase (1). For example, one could put the phrase "are beautiful" after any one of the phrases (1) through (6) above.

In generative grammar, headedness also relates to the ordering of words in a phrase sequentially. The head of a phrase is typically restricted to being the first or last word in the phrase. For example, in the English noun phrase "the alleged conspirator" the head is the last word, or as known to those skilled in the art, head-final. In the English verb phrase "conspired with the general," the verb "conspired" is the head, in first or head-initial, position in the phrase. But word order is not totally fixed, even in English, because a head noun can also occur in a medial position, as in the phrase "the alleged conspirator of the attorney general" and sometimes the head noun can even occur in head-initial position, as in "the attorneys general."

Such variations or options in language reveal markedness (described below) by demonstrating how some English syntactic patterns such as head-final noun phrases are much more usual and easy to understand than other syntactic patterns such as head-initial noun phrases. This particular binary contrast between head position (final/not-final) is simply one example of how binary contrasts organize language asymmetrically.

Markedness is the basic asymmetry in language which pervades the binary substructure of linguistic signs. Language is structured for binary contrasts such as voiced/unvoiced at the phonetic level, nominative/non-nominative at the morphological level, mass/count at the semantic level, recursive/nonrecursive at the syntactic level.

Yet even though language is structured for binary contrasts, the contrastive items are not equally interchangeable. For example, the binary contrast of the concept [age] is lexicalized in English as [young]/(old). But the binary distinction between [young]/[old] is not symmetrical, not equal, as shown by the fact that these two terms are not interchangeable. When we are inquiring about age in English, we ask [how old are you?] for the unmarked use, while we can, in the marked use, as [just how young are you?]. Similarly, the head-final noun phrase is unmarked, while the head-initial noun phrase is marked.

Another binary contrast in language is the distinction between the nominal and the predicative. Nominal or noun-like parts-of-speech can substitute for each other, but never for predicative or verb-like parts-of-speech. Predicative parts-of-speech relate nominals to other nominals and even require nominals, as in logic functions require arguments, but nominal parts-of-speech do not. Although syntactic categories and part-of-speech labeling schemes can be extremely detailed and complex, this basic distinction between nouns and verbs is respected in all syntactic theories and substantiated in all languages.

The complexity and detail of part-of-speech tagging schemes is directly related to the purpose of the syntactic analysis. For example, fewer tags are needed for diagramming sentences than for generating sentences. There are six tagging schemes described in Manning and Schuetze (1999), ranging in size from 45 to 197, far more POS tags than occur in the traditional, school grammar list of nouns, verbs, adjectives, adverbs, prepositions, determiners and conjunctions.

As will be shown in the present application, embodiments of the present invention employ a number of variable sets, which, while including two stylometric variables, focus on syntactic structure in ways not found in prior art methods. Further, embodiments of the present invention reduce the number of variables needed for authorship attribution, enabling the method to be used with smaller sized text samples (such as about 500 words) than had been used previously. These variable groups are briefly described below, and in more detail within the Detailed Description of the Invention section.

Briefly, an embodiment of the present invention is a method for authorship attribution with the linguistic-variable component implementing a specific POS tagging scheme; syntactic variables based on markedness and the nominal/predicative contrast; punctuation variables based on syntactic attachments, and stylometric variables; and the classification-algorithm component enabling both sentence-level and document-level data for model-building with cross-validation and classification at the document level.

In the method, which can be implemented in a computing environment, each word in each text is labeled according to the syntactic functions in this specific POS tagging scheme. In other words, each grammatical category (noun, verb, preposition, conjunction, modifier, adjective, determiner, subordinator, an interjection) is labeled in the document. The phrases which these grammatical categories create through headedness are classified into marked ("m") or unmarked ("u") types. These marked and unmarked syntactic phrases constitute seventeen syntactic variables. The method enables these seventeen variables to be collapsed into two variables based on markedness values or four variables based on the nominal/predicative contrast. Each punctuation mark in each text is classified by what type of syntactic edge it is marking, i.e., what type of syntactic edge the mark attaches to, as well as discursive function, for a total of four punctuation variables. In addition to the syntactic and punctuation (also known as graphemic) variables, the method also includes two stylometric variables (word and paragraph length). A range of variable sets are available from the procedures for creating the variables; the variable sets contain as many as twenty-two or as few as six variables. When the largest variable sets are used, the method details how sentence-level data is used for model-building, while the classification cross-validates on, and predicts the authorship of, document-level data. When the small variable sets are used, the method employs the standard document-level data and cross-validation procedures in prior art.

This inventor believes that the particular variables based on the specific POS tagging scheme, principles of syntactic markedness and syntactic edges are causing the good accuracy results, as any classification algorithm can only work as well as the input variables allow, as discussed in greater detail within the Detailed Description of the Invention section.

BRIEF SUMMARY OF THE INVENTION

An object of the present invention is to provide a method to determine authorship of a textual document.

Another object of the present invention is to provide a method to determine authorship of a document which was created using electronic means.

Still another object of the present invention is to provide a method to determine authorship of a document that does not involve handwriting analysis.

Yet another object of the present invention is to provide a method to determine authorship using syntactic variables based on the combinatoric markedness of the parts-of-speech of the document.

Still another object of the present invention is to provide a method for authorship attribution that uses graphemic variables based on the syntactic edges to which punctuation marks attach.

Yet another object of the present invention is to provide a method for authorship attribution, by reducing the number of linguistic variables based on the markedness contrast, so that fewer documents are required.

Still another object of the present invention is to provide a method for authorship attribution, by reducing the number of linguistic variables based on the nominal/predicative contrast, so that fewer documents are required.

Another object of the present invention is to provide a method for authorship attribution utilizing part-of-speech tags which are the building blocks for the combinatoric markedness of phrases.

BRIEF DESCRIPTION OF THE SEVERAL VIEWS OF THE DRAWING

FIGS. 3 and 4 schematically illustrate the method embodiment for authorship attribution.

DETAILED DESCRIPTION OF THE INVENTION

The present invention comprises a system and a method for determining the authorship of a textual work, such as a letter, a note, a book, manuscript, or other document. Because embodiments of the present invention can be used with short works, the system and method of the present invention has applications in the forensic setting, such as, for example only and not intended as a limitation, identifying a known criminal, a kidnapper, a hostage-taker, or person(s) involved in various terrorist activities.

Figure 1:
FIG. 1 schematically illustrates author attribution using variable/feature sets and statistical procedures.
Figure 2A:
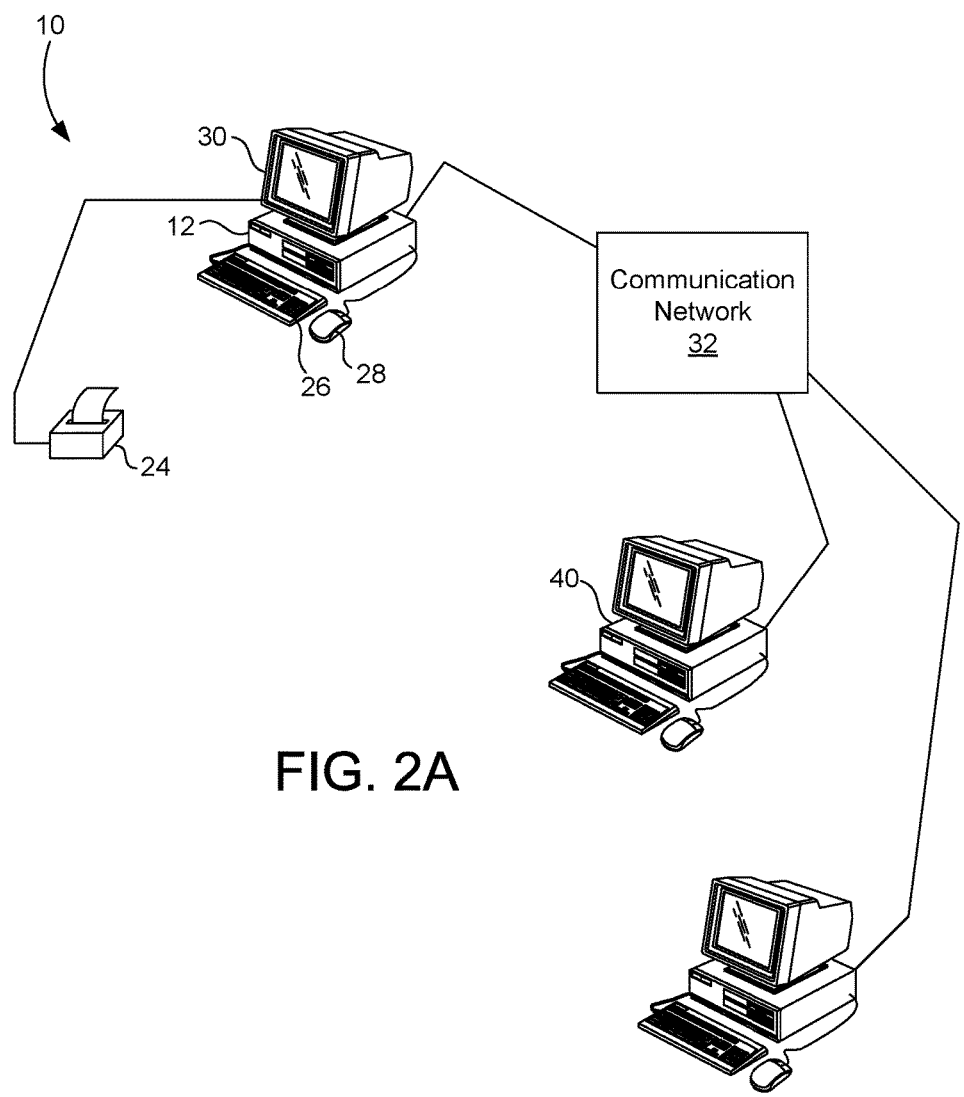
FIG. 2a is a schematic view of a representative computing environment in which embodiments of the present invention can be practiced.
Figure 2B:
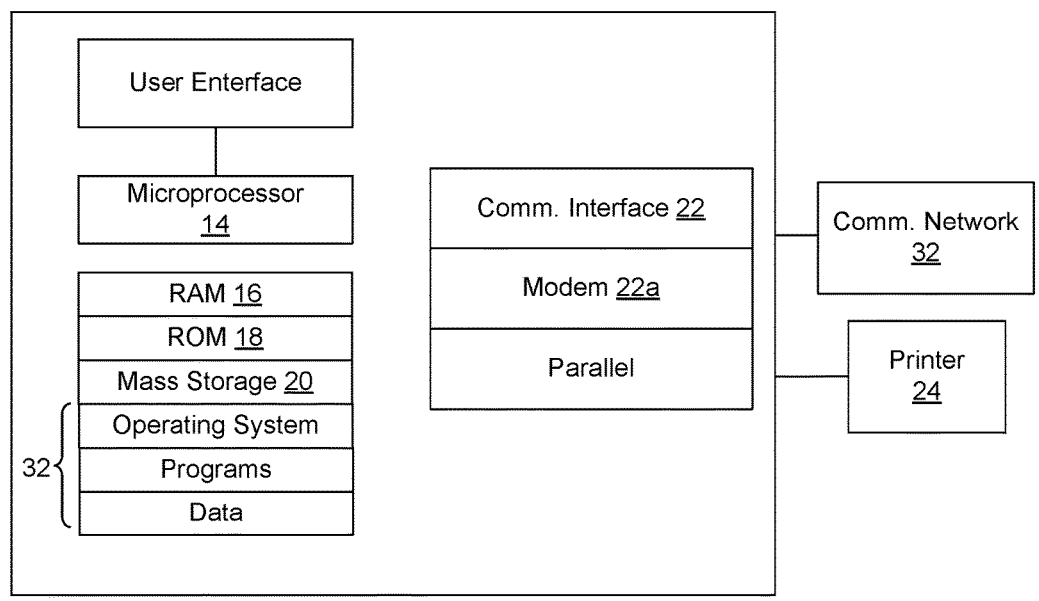
FIG. 2b illustrates exemplary system components.

An embodiment of the present invention can be utilized with a computing system 10, such as an exemplary system illustrated in FIG. 2. The computing system 10 illustrated is only a representative computing system, and is not intended to be limiting factor in either the scope of the use, of the functionality of the present invention, except as described in the claims.

Consequently, embodiments of the present invention are operational with a variety of other general purpose or special purpose computing system configurations or environments. Some examples, and again, these are examples only and not intended to be any limitations on the present invention, are personal computers, computer servers, laptop computers and devices, hand-held computers and devices, multiprocessor systems, microprocessor-based systems, programmable consumer electronics, network personal computers, minicomputers, mainframe computers, devices referred to as set-top boxes, distributed computing environments that include any of the systems or devices described herein, and the like.

Embodiments of the present invention may be utilized in the general context of computer-readable directions, such as software programs that can be effected by a computer. Examples of such programs include, but are not limited to, programs, routines, components, data structures, objects and the like that carry out specific functions or implement specific abstract data types. Embodiments of the present invention may also be carried out where the tasks are performed by one or more remote processing devices that are linked through a communications network, such as in a distributed computing environment. In a distributed computing environment, program modules may be situated both in local and remote computer storage media, including memory storage devices.

The inventor has written a software application designated "ALIAS" (Automated Linguistic Identification and Assessment System, Chaski ((1997, 2001)) to perform the analysis which follows. Use of this software involves a human interacting with the program to check the results of the automated tagging and for classifying syntactic phrases.

Each text is processed using ALIAS, a software program for the purpose of databasing texts, lemmatizing, lexical frequency ranking, lexical, sentential and text lengths, punctuation-edge counting, POS-tagging, n-graph and n-gram sorting, and markedness subcategorizing. ALIAS is thus able to provide a large number of linguistic variables.

Without intending to be a limitation, this program is designed to be used by computers running the Windows and Macintosh operating systems. The computer can be a standalone computer, or connected to one or more computers using a network, such as a wired or wireless network, the world wide web, the Internet, or the like. The text in question is entered into the computer using any one of a variety of input means, such as by scanning, facsimile, direct entry using a keyboard, photography, file transfer, copying from a magnetic, optical or video disk, or other appropriate means of inputting information into a computer system.

Thus, a representative computing environment comprises a computer 12 equipped with a microprocessor 14, random access memory 16, read-only memory 18, a mass-storage device 20 such as a hard disk, and a communications means 22 to enable the computer 12 to communicate with output devices such as a printer 24.

The communications means 22 may comprise a printer interface, which may be either a parallel, serial, Universal Serial Bus ("USB") or IEEE 1394 Firewire, and appropriate cabling to the printer, or may be a wireless communications interface. A second communications means 22a may comprise a modem and communications port, such as serial port, SCSI or SCSCII, or USB interface enabling the computer 12 to communicate with communications network 32, such as a public telephone net, the Internet, an extranet, the world wide web, or other wired or wireless communications system. Such communications means 22 may also comprise a cable modem and a connection to a cable services, an ISDN modem and ISDN line, a Digital Subscriber Line ("DSL") modem and DSL line, T-1 line, and the like, now known or to be developed in the future. The representative system further includes an input means, such as a keyboard 26, a mouse 28, or similar device such as a Touch-Pad or pointing device such as the ACCUPOINT (Registered Trademark of Toshiba America Information Systems, Inc. for a cursor control device for computers, attached to the computer keyboard.) or scanner (not shown), and a visual display means 30 such as a cathode ray tube ("CRT") monitor, flat screen, liquid crystal display ("LCD"), plasma, dual-scan monitor, thin-film transistor ("TFT"), active-matrix monitor, or the like, now known to be developed in the future. Software 33 which is resident in the computer's memory, or which may be stored in the memory of another computer such as a server in a computer network or other central computer includes the operating system necessary for operation of the computer. Among the possible operating systems the MACINTOSH® Operating System (Registered trademark of Apple Computer, Cupertino, Calif.), Windows, or the like.

The various embodiments of the present invention are based on particular concepts of generative grammar which have been briefly described in the Background Section D.

The inventor has created a method for analyzing punctuation to create three graphemic variable sets, the Syntactic Edge Version; the Syntactic Edge and Emphasis Version; and the Locality Version. The graphemic analysis of the textual data counts the punctuation as it is attached to different levels of linguistic structure, from word to phrase to clause to sentence to discourse.

The inventor has created a method for analyzing syntactic phrases to create three syntactic variable sets: a Full Version; an XP Version; and a NOM Version. Sometimes there is not enough data, especially in a forensic situation, to use the full version of the syntactic variables. Therefore, the inventor has created two collapsed versions of the Full version, called the XP version and the NOM version. Either the XP or NOM variable sets can be used when the amount of textual data is not large enough to use the Full version. The syntactic analysis of the textual data divides each syntactic function into its marked and unmarked versions.

In an embodiment of the present invention, after the text has been entered into the system, the text is split into its constituent sentences, shown schematically in FIG. 3.

Each punctuation mark in each sentence is categorized by the type of syntactic edge to which it attaches and any punctuation marks with additional discursive functions are categorized as such, resulting in four variables. (The detailed schema is described below in Section 1).

Each sentence is split into its constituent words.

Each word is labeled as to its part-of-speech ("POS"). (The detailed schema for POS-tagging is described below in Section 2).

The combinations of words into phrases is then listed for each word.

The phrases are then listed for each head (for example, all of the noun phrases, all of the verb phrases, all of the adjective phrases, etc.).

The phrases are then characterized by markedness. For each head there are two subtypes: marked and unmarked.

The subtypes for each head are counted, which results in seventeen variables. (The detailed schema is described below in Section 2.)

The number of phrases can be reduced by summing by markedness, which results in two variables. (The detailed schema is described below in Section 2.)

The number of phrases can be reduced by nominal/predicative contrast, which results in four variables. (The detailed schema is described below in Section 2.)

These variables are combined with two stylometric variables. (The detailed schema is described below in Section 3).

The above counts are then analyzed using a variety of statistical procedures. (The detailed schema is described in Section 4).

Section 1 explains the method for obtaining the graphemic variables.

Section 2 explains the POS tagging scheme and the method for obtaining the syntactic variables.

Section 3 shows how these variables are combined with stylometric variables to create the variable sets which can be fed into the classification algorithms.

Section 4 describes the settings for some of the classification algorithms which have been used with the different variable sets, including the LODO cross-validation method for sentence-level data, and provides experimental results of authorship attribution on the forensically-feasible dataset shown in Table 3 above.

1. The Graphemic Analysis

The graphemic analysis produces a set of variables which organize the punctuation marks in textual data in a novel way, i.e. in their relation to syntactic and discourse functions in the text. Syntax is the study of the possible combinations of word units into grammatical phrases. Discourse is the study of how sentential units are combined and how communicative effect is conveyed (e.g. how we recognize irony, agreement and other rhetorical effects).

Grammatical combinations (also known as constituent structures) have beginnings and endings. When we combine the words [the] and [dog] into the phrase [the dog], we have created a constituent structure known as a Noun Phrase which begins with [t] and ends with [g]. Constituent structures can be large; for example, a Sentence is created by combining Noun Phrase and Verb Phrase [noun phrase "a Sentence" plus Verb Phrase "is created by combining a Noun Phrase and a Verb Phrase"]. A smaller unit is the phrase; for example a Prepositional Phrase is created by combining a Preposition with a Noun Phrase [preposition "with" plus a Noun Phrase "a noun phrase"]. Even smaller units of combination are possible when the internal, minimal, meaning-bearing units of words (called morphemes) are combined to create words; for example, a Noun combined with a Possessive morpheme creates a Possessive Noun [a noun "Jim" plus possessive morpheme creates "Jim's"]. Since these combinations have beginnings and endings as constituent structures, these beginnings and endings are called edges.

Each punctuation mark is classified by what type of syntactic edge it is marking. Chaski (2001) showed that syntactically-classified punctuation had a better performance than using simple punctuation marks for discriminating authors while preserving intra-author classification. Authors may share the same array of punctuation marks, but the placement of the punctuation marks appears to be what matters. This approach to using punctuation as an authorial identifier is different from the approaches advocated by questioned document examination (Hilton, 1993), forensic stylistics (McMenamin 2003), or the computational studies discussed in the Background Section.

The inventive classification procedure is illustrated in examples below. There are four syntactic edges which are considered: edge of sentence ("EOS"); edge of clause ("EOC"); edge of phrase ("EOP") and edge of morpheme (or word-internal) ("EOM") and one discursive function ("EPMH"). This gives five variables: EOS, EOC, EOP, EOM and Emphatics (EMPH).

EOS (Edge of Sentence)

Any punctuation mark which marks the edge of a sentence is counted as an EOS. Example A shows a sentence marked off by an exclamation point and quotation mark for 2 EOS. (The leftmost quotation mark is counted as one edge-of-phrase marker).

Example A: He screamed "Fire!"

EOC (Edge of Clause)

Any punctuation mark which marks the edge of a clause within a sentence is counted as an EOC. Example B shows a clause marked off by a comma for 1 EOC.

Example B: After he joined the army, he saw how precious life can be.

EOP (Edge of Phrase)

Any punctuation mark which marks the edges of a phrase is counted as an EOP. The phrase can be marked at both the beginning and ending of the phrase or only at the ending of the phrase. Example C below shows 2 EOP, while Example D shows 1 EOP.

Example C: He went, for a while, to the college in town.

Example D: For a while, he went to the college in town.

EOM (Emphatics)

Any punctuation mark which marks the edge of a morpheme is counted as an EOM. Example E shows word-internal punctuation of 1 EOM each. Example F shows phrase-internal punctuation for 3 EOM.

Example E: re-invent, John's, wouldn't
Example F: the by-gee-by-golly reaction
EMPH Any punctuation mark which indicates discursive emphasis such as multiple punctuation marks, underlining, bolding, italics, capitalization, emoticons is counted as an EMPH (for emphatics). Example G shows 2 EMPH, one of which is lexical-phrasal (the YOU) and the other of which is clausal (the ????).

Example G: What were YOU thinking????

Graphermic 1: Syntactic Edge Version

The punctuation relating only to syntactic structure of the sentence are included in this variable set.: EOS, EOC, EOP and EOM. Due to the data requirements of different classification algorithms, EOS and EOC can be summed together, for three variables in this version (EOS+EOC, EOP and EOM) or EOS can be excluded completely (as it is usually not normally distributed) for the following three variables in this version (EOC, EOP, EOM).

Graphemic 2: Syntactic Edge and Emphasis Version

The syntactic edge variables are combined with the discursively-based variable EMPH. This variable set thus includes EOC (optionally summed with EOS), EOP, EOM and EMPH.

Graphemic 3: Locality Version

An important concept within syntactic analysis is locality, which refers to the syntactic structure within which a relation can occur and beyond which the relation cannot occur. In syntax, one localizing or bounding node is the beginning of a clause; there are syntactic dependencies which can occur within a clause which cannot go beyond the clause (like subject-verb agreement).

In the Locality Version of the punctuation variable set, the variables are subcategorized by whether they occur at the above-clause or below-clause levels. The variables EOM and EOP are summed together for the lexical-phrasal level. The variables EOS and EOC are summed together for the clausal level. EMPH is divided into lexical-phrasal (such as the YOU in Example G) and clausal (such as the ???? in Example G). This variable set thus includes:

Sub-Clausal: EOM+EOP+lexical-phrasal EMPH
Clausal: EOS+EOC+clausal EMPH.

2. The Syntactic Analysis

The syntactic analysis begins with Part-Of-Speech ("POS") tagging. Each word in the textual data is tagged for its part-of-speech in the sentence in which it occurs. As mentioned in Section D above, the inventive POS procedure works well with short texts which are typical of forensic authorship attribution. The POS tags used are shown in Table 5:

TABLE 5

POS Tags

| POS tag | Grammatical Function | Examples |
|---|---|---|
| A | adjective | big, alert, interesting |
| Conj | conjunction | and, yet, as well as |
| Det | determiner (aka specifier, article) | a, an, the, this |
| Det-poss | possessive pronoun | his, her, your, its |
| M | modifier (aka adverb) | usually, very |
| N | noun | concept, dog |
| N-proper | proper noun | John, President |
| N-wh | wh-noun | who, which, what |

TABLE 5-continued

POS Tags

| POS tag | Grammatical Function | Examples |
|---|---|---|
| N-pro | pronoun and anaphor | I, you, she, he, it, himself, themselves |
| N-poss | possessive noun | John's, President's |
| P | preposition | by, for, up to |
| V-agr | finite verb | goes, studies, invents, went, studied |
| V-mod | modal verb | could, may, would |
| V-to | infinitive verb marker | to (as in [to go, to study] |
| V-base | infinitive form | go, study, invent |
| V-prog | progressive form | going, studying, inventing |
| V-pprt | participial form | gone, studied, invented |
| V-neg | negative marker for verb | not |
| Subn | subordinator (aka complementizer) | that, when, where, how, if |
| Intj | interjection | wow, yeah, yes, darn |

The POS tags are the input to syntactic analysis. The syntactic analysis produces a set of variables which organize the syntactic structures in textual data in a novel way based on their markedness (whether they are marked or unmarked) or whether they are nominal or not (nominal or predicative).

2.1. Syntactic Analysis: Full Version: Marked and Unmarked Syntactic Phrases

For syntactic structures, the unmarked contrast is the most common and often the most easily parsed because its informational content is unambiguous, while the marked contrast is typically less frequent, sometimes more difficult to parse because it can pose several different parsing attachments and its informational content is determined by different attachments.

After each word is POS-tagged, the method classifies each instance of each grammatical category into marked (m) or unmarked (u) subcategories according to the following schemes:

TABLE 6

Adjective Phrases ("AP")

| marked (mAP) | unmarked (uAP) |
|---|---|
| predicative | attributive |
| takes complement | does not take complement |

TABLE 7

CONJUNCTION (CONJ)

| marked (mCONJ) | unmarked (uCONJ) |
|---|---|
| conjoins sentences | conjoins phrases |

TABLE 8

DETERMINER PHRASE ("DP")

| marked (mDP) | unmarked (uDP) |
|---|---|
| definite multiple quantifiers possessive noun | indefinite singular |

TABLE 9

MODIFIER PHRASE ("MP")

| marked (mMP) | unmarked (uMP) |
|---|---|
| scope over entire sentence | scope over adjective |
| scope over verb | scope over modifiers |

TABLE 10

PREPOSITIONAL PHRASE ("PP")

| marked (mPP) | unmarked (uPP) |
|---|---|
| recursive | non-recursive |
| doubled preposition | |

TABLE 11

NOUN PHRASE ("NP")

| marked (mNP) | unmarked (uNP) |
|---|---|
| head-medial position | head-final position |
| head initial position | |
| nominal compounds | |
| wh-word (headed or headless) | |

TABLE 12

VERB PHRASE ("VP")

| marked (mVP) | unmarked (uVP) |
|---|---|
| non-finite | finite |

TABLE 13

SUBORDINATOR ("SUBN") (also known as Complementizer)

marked (mSUBN)
complementizers marking subordinate clause

TABLE 14

INTERJECTION ("INTJ")

marked (mINTJ)
words without combinatorial functions such as exclamations, salutations, etc.

TABLE 15

PRONOUN ("N-PRO")

marked (mN-Pro)
all pronouns, and anaphors (I, myself; yours, yourself; him, himself) except for possessive pronouns functioning as determiners (such as his, her, your, my).

2.2. Syntactic Analysis: XP Version: Marked and Unmarked Syntactic Phrases Collapsed by Summing Linguistic theory shorthand uses "X" to represent any syntactic category, such as an adjective, determiner, noun, modifier, preposition, etc. The term XP thus represents any type of syntactic phrase or function.

The full version (from Section 2.1) is collapsed by summing the marked counts and unmarked into two variables:

$$MXP = mAP + mCONJ + mNP + mPP + mVP + Subn + Intj$$

$$uXP = uAP + uCONJ + uNP + uPP + uVP$$

DP can also be added in optionally to both the mXP and uXP variables.

2.3. Syntactic Analysis: NOM Version: Marked and Unmarked Syntactic Phrases Collapsed by Nominal-Predicative Contrast The full version (from Section 2.1) is collapsed by summing the marked and unmarked counts into four variables:

$$NOM = uDP + mDP + uNP + mNP + N\text{-}PRO$$

$$PRED = mAP + uVP + mVP$$

$$COMP = uCONJ + mCONJ + Subn$$

$$MOD = uAP + uMP + mMP + uPP + mPP$$

3. The Variable Sets

The variables explained above are combined with each other and with two traditional stylometric variables to create different variable sets for forensic authorship attribution.

The stylometric features are average word length ("AVGWL"), and average paragraph length ("AVGPL"). AVGWL is calculated using all words in the sentence. AVGPL is calculated by dividing the number of paragraphs in the document by the number of sentences in the document; it is only used at the document level analysis.

Example variable sets include:

1. Full version of Marked/Unmarked Syntax With Graphemic 1 With Stylometric 1
    [uAP, mAP, uConj, mConj, uDP, mDP, uMP, mMP, uNP, mNP, uPP, mPP, uVP, mVP, Subn, N-PRO, INTJ];   Syntactic
    [EOC, EOP, EOM];   Graphemic
    AVGWL   Stylometric
2. XP version With Graphemic 1 With Stylometric 1
    [uXP, mXP];   Syntactic
    [EOC, EOP, EOM];   Graphemic
    AVGWL   Stylometric
3. NOM version Plus Graphemic 1 Plus Stylometric 1
    [NOM, PRED, COMP, MOD];   Syntactic
    [EOC, EOP, EOM];   Graphemic
    AVGWL   Stylometric
4. XP version With Graphemic 1 With Stylometric 2
    [uXP, mXP];   Syntactic
    [EOC, EOP, EOM];   Graphemic
    AVGWL;   Stylometric
    AVGPL   Stylometric
5. NOM version Plus Graphemic 1 Plus Stylometric 2
    [NOM, PRED, COMP, MOD];   Syntactic
    [EOC, EOP, EOM];   Graphemic
    AVGWL;   Stylometric
    AVGPL   Stylometric
6. XP version With Graphemic 2 With Stylometric 3
    [uXP, mXP];   Syntactic
    [EOC, EOP, EOM, EMPH];   Graphemic
    AVGWL   Stylometric
7. NOM version Plus Graphemic 2 Plus Stylometric 3
    [NOM, PRED, COMP, MOD];   Syntactic
    [EOC, EOP, EOM, EMPH];   Graphemic
    AVGWL   Stylometric
8. XP version With Graphemic 2 With Stylometric 3
    [uXP, mXP];   Syntactic
    [EOC, EOP, EOM, EMPH];   Graphemic
    AVGWL;   Stylometric
    AVGPL   Stylometrid -continued 9. NOM version Plus Graphemic 2 Plus Stylometric 3
   [NOM, PRED, COMP, MOD];           Syntactic
   [EOC, EOP, EOM, EMPH];            Graphemic
   AVGWL;                            Stylometric
   AVGPL                             Stylometric
10. XP version With Graphemic 3 With Stylometric 1
   [uXP, mXP];                       Syntactic
   [Clausal, SubClausal];            Graphemic
   AVGWL                             Stylometric
11. NOM version Plus Graphemic 3 Plus Stylometric 1
   [NOM, PRED, COMP, MOD];           Syntactic
   [Clausal, SubClausal];            Graphemic
   AVGWL                             Stylometric
12. XP version With Graphemic 3 With Stylometric 2
   [uXP, mXP];                       Syntactic
   [Clausal, SubClausal];            Grapheic
   AVGWL;                            Stylometric
   AVGPL                             Stylometric
13. NOM version Plus Graphemic 3 Plus Stylometric 2
   [NOM, PRED, COMP, MOD];           Syntactic
   [Clausal, SubClausal];            Graphemic
   AVGWL;                            Stylometric
   AVGPL                             Stylometric
14. Full version of Marked/Unmarked Syntax With Graphemic 1
    With Stylometric 2
   [uAP, mAP, uConj, mConj, uDP, mDP,   Syntactic
   uMP, mMP, uNP, mNP, uPP, mPP, uVP,
   mVP, Subn, N-PRO, INTJ];
   [EOC, EOP, EOM];                  Graphemic
   AVGWL;                            Stylometric
   AVGPL                             Stylometric
15. Full version of Marked/Unmarked Syntax With Graphemic 2
    With Stylometric 1
   [uAP, mAP, uConj, mConj, uDP, mDP,   Syntactic
   uMP, mMP, uNP, mNP, uPP, mPP, uVP,
   mVP, Subn, N-PRO, INTJ];
   [EOC, EOP, EOM, EMPH];            Graphemic
   AVGWL                             Stylometric
16. Full version of Marked/Unmarked Syntax With Graphemic 2
    With Stylometric 2
   [uAP, mAP, uConj, mConj, uDP, mDP,   Syntactic
   uMP, mMP, uNP, mNP, uPP, mPP, uVP,
   mVP, Subn, N-PRO, INTJ];
   [EOC, EOP, EOM, EMPH];            Graphemic
   AVGWL;                            Stylometric
   AVGPL                             Stylometric
17. Full version of Marked/Unmarked Syntax With Graphemic 3
    With Stylometric 1
   [uAP, mAP, uConj, mConj, uDP, mDP,   Syntactic
   uMP, mMP, uNP, mNP, uPP, mPP, uVP,
   mVP, Subn, N-PRO, INTJ];
   [Clausal, SubClausal];            Graphemic
   AVGWL                             Stylometric
18. Full version of Marked/Unmarked Syntax With Graphemic 3
    With Stylometric 2
   [uAP, mAP, uConj, mConj, uDP, mDP,   Syntactic
   uMP, mMP, uNP, mNP, uPP, mPP, uVP,
   mVP, Subn, N-PRO, INTJ];
   [Clausal, SubClausal];            Graphemic
   AVGWL;                            Stylometric
   AVGPL                             Stylometric 4. Classification Algorithm Settings Not all of the variable sets can be used with every classification algorithm because of textual data restrictions or the distributions within the counts from the textual data. The classification algorithms allow for optional settings within commonly used statistical packages such as SPSS, SAS, LNKnet or DTREG. (SAS is a commercial software package distributed by SAS Institute, Cary, N.C.; DTREG is commercial software for statistical analysis; LNKnet is open source software for statistical analysis available from MIT Lincoln Laboratory, Cambridge, Mass.).

In Background Section C, experimental results using the invention were briefly summarized in Table 4, and which is repeated below for convenience.

TABLE 4

Accuracy Rates Using Syntactic Analysis and Variable Sets

| Exp[a] | Variable Sets | Textual Units (for counts of variables) | Classification Algorithm | Overall Accuracy |
|---|---|---|---|---|
| 1. | 1 | Sentences, Mean of Document | Linear DFA[b] using LODO[c] cross-validation | Opposite Sex Pairs: 98% All Pairs: 91% |
| 2. | 2 | Document | Linear DFA | 95% |
| 3. | 3 | Document | Linear DFA | 91% |
| 4. | 7 | Document | Logistic Regression | 96% |

[a]Exp = Example Experiments
[b]DFA = discriminant function analysis
[c]LODO = leave one document out These experiments are now described in detail so that the operation of the method and particular classification algorithm settings can be understood.

EXAMPLE 1

Analysis of Authorship Based on Sentences

In this example, document analysis was done using analysis of sentences, but the prediction of authorship is on the document level Variable Set 1 includes 21 variables. Seventeen of these variables are syntactic (related to phrasal type); three are graphemic (related to punctuation) and one is stylometric (average word length). The variable counts were extracted for each sentence for each author. The commercial statistical software SPSS was used to perform Discriminant Analysis.

The statistical model for each author pair was built using sentence level data for the authors, with one document's sentences left out from the model building. Instead of predicting the membership of the holdout (or left-out) document based on its sentences, the means of each variable (using all the sentences in the document) are used, such that while the model is built at the sentence level, the prediction is on the document level.

A pair-wise discriminant analysis was performed using the feature counts for each sentence of each document.

Let $X_{i,j,k}$ denote an M-vector containing the counts for M syntax features (m=1, . . . , M) in sentence k=1, . . . , $K_{i,j}$ of document j=1, . . . , $J_i$ written by author I=1, . . . , $N_a$. Here $K_{i,j}$ denotes the number of sentences in document j by author I, $J_i$ denotes the number of documents by author I, and $N_a$ denotes the number of authors. The database contains a total of $N_s = \Sigma_i \Sigma_j K_{i,j}$ sentences found in $N_d = \Sigma_i J_i$ documents written by $N_a$ authors.

In the pair-wise analysis, only the documents for a selected pair of authors are included in the analysis, the procedure is repeated for all possible author pairings. There are $N_p = N_a(N_a-1)/2$ author pairs to consider in the cross-validation analysis. For each pair of authors, data at the sentence level was used to estimate a linear function for discriminating between the two authors. Then the prediction of authorship is made using document-level mean feature counts per sentence in the document with "unknown" authorship.

This method provides a large sample size for estimating the discriminant functions by using feature counts at the sentence level. The larger sample size permits the use of a large number of feature variables for discriminating between authors. Use of feature counts at the document level does not support the use of a large number of variables, unless a relatively large number of documents is available for each author. In our data (see Tables 2 and 3), as few as three documents were available for several authors, a situation that is very common in forensic applications of authorship attribution. The larger sample size also provides a better estimate of the discriminant function coefficients and the pooled variance-covariance matrix which is used in linear discriminant analysis to compute the Mahalanobis distances between data points. These distances provide the basis for determining the probabilities of group membership, i.e. authorship attribution.

The pair-wise cross-validation was conducted using a "Leave one document out" ("LODO") procedure. In this procedure, one document (written by, for example, author r) was selected from the set of documents for a pair of authors (r and s), and all sentences in the LODO document were removed from the data set for pair-wise analysis. The goal was to correctly predict the authorship of the LODO document by fitting a model using only the remaining $(J_r-1)$ documents known to be written by the author r and the $J_s$ written by the other author. The discriminant function for this pair was estimated using all the sentences in the $J_r+J_s-1$ documents which remained after sentences in the LODO document were removed.

After the discriminant function for this pair was estimated using SPSS, it was used to predict the authorship of the LODO document. The vector of mean feature counts for the LODO document was calculated as $Y=\Sigma_k X_{i,j,k}/K_{i,j}$. These mean feature counts, averaged over all sentences in the LODO document, are then inserted in the estimated discriminant function to assign authorship of the LODO document to one of the pair of authors.

Table 16 shows the accuracy results for this variable set and classification algorithm, reporting the results for all ten authors when each is compared only with authors of the opposite sex.

TABLE 16

Accuracy Results for Opposite Sex Author Pairs using Inventor Variables Set 1 with Discriminant Analysis and LODO Cross-Validation

| Author | Author ID | Number of Documents | Number of LODO Trials | Percent Correctly Classified | Percent Incorrectly Classified |
|---|---|---|---|---|---|
| Females | | | | | |
| 1 | 16 | 6 | 30 | 100.0 | 0.0 |
| 2 | 23 | 5 | 25 | 100.0 | 0.0 |
| 3 | 80 | 10 | 50 | 100.0 | 0.0 |
| 4 | 96 | 10 | 50 | 96.0 | 4.0 |
| 5 | 98 | 4 | 20 | 100.0 | 0.0 |
| All females | | 35 | 175 | 98.9 | 1.1 |
| Males | | | | | |
| 6 | 90 | 8 | 40 | 95.0 | 5.0 |
| 7 | 91 | 6 | 30 | 93.3 | 6.7 |
| 8 | 97 | 6 | 30 | 100.0 | 0.0 |
| 9 | 99 | 7 | 35 | 100.0 | 0.0 |
| 10 | 168 | 7 | 35 | 100.0 | 0.0 |
| All males | | 34 | 170 | 97.6 | 2.4 |
| All authors | | 69 | 345 | 98.3 | 1.7 |

Table 17 shows the accuracy rates for this variable set and classification algorithm when each of the authors is compared with each other, including both same-sex and opposite-sex pairs.

TABLE 17

Accuracy Results for Same-Sex and Opposite-Sex Author Pairs using Inventor Variables Set 1 with Discriminant Analysis and LODO Cross-Validation

| Author | Author ID | Number of Documents | Number of LODO Trials | Percent Correctly Classified | Percent Incorrectly Classified |
|---|---|---|---|---|---|
| Females | | | | | |
| 1 | 16 | 6 | 54 | 96.3 | 3.7 |
| 2 | 23 | 5 | 45 | 88.9 | 11.1 |
| 3 | 80 | 10 | 90 | 94.4 | 5.6 |
| 4 | 96 | 10 | 90 | 90.0 | 10.0 |
| 5 | 98 | 4 | 36 | 91.7 | 8.3 |
| All females | | 35 | 315 | 92.4 | 7.6 |
| Males | | | | | |
| 6 | 90 | 8 | 72 | 88.9 | 11.1 |
| 7 | 91 | 6 | 54 | 81.5 | 18.5 |
| 8 | 97 | 6 | 54 | 94.4 | 5.6 |
| 9 | 99 | 7 | 63 | 90.5 | 9.5 |
| 10 | 168 | 7 | 63 | 92.1 | 7.9 |
| All males | | 34 | 306 | 89.5 | 10.5 |
| All authors | | 69 | 621 | 91.0 | 9.0 |

EXAMPLE 2

Attribution of Authorship: Document Level Analysis

Variable Set 2 comprises six variables. Two of these variables (mXP, uXP) are syntactic (related to phrasal type); three (EOC, EOP, EOM) are graphemic (related to punctuation) and one (AVGWL) is stylometric (average word length). The variable counts were extracted for each sentence for each author, and then summed for each document for each author.

Linear discriminant function analysis was performed using SPSS. The statistical model for each author pair was built using document level data for the authors, with leave-one-out (LOO) cross-validation. This kind of cross-validation, where the unit of analysis and the unit for cross-validation are the same (both document-level data), is a standard option in SPSS; it is unlike LODO cross-validation which was described earlier. The following SPSS options were selected: stepwise entry of variables, default values of F to enter or remove variables, Mahalanobis distance and prior probabilities computed based on group size.

Table 18 shows the accuracy results, with an overall accuracy rate of 95%; the individual authors' accuracy rates range from 92% to 98%. One author pair had no variables qualify for the analysis under these parameters.

TABLE 18

Accuracy results for Variable Set Using SPSS Linear DFA

| Author | 16 | 23 | 80 | 90 | 91 | 96 | 97 | 98 | 99 | 168 |
|---|---|---|---|---|---|---|---|---|---|---|
| 16 | X | 100 | 100 | 100 | 100 | 100 | 100 | 70 | 100 | 100 |
| 23 | 100 | X | 100 | 100 | 100 | 100 | 100 | 89 | 92 | 100 |
| 80 | 100 | 100 | X | 94 | 100 | 70 | 100 | 100 | 82 | 100 |
| 90 | 100 | 100 | 94 | X | 71 | 94 | 100 | 100 | 87 | 80 |
| 91 | 100 | 100 | 100 | 71 | X | 100 | 92 | 100 | nvq[a] | 100 |
| 96 | 100 | 100 | 70 | 94 | 100 | X | 88 | 100 | 88 | 100 |
| 97 | 100 | 100 | 100 | 100 | 92 | 88 | X | 100 | 100 | 100 |
| 98 | 70 | 89 | 100 | 100 | 100 | 100 | 100 | X | 91 | 100 |
| 99 | 100 | 92 | 82 | 87 | nvq | 88 | 100 | 91 | X | 93 |
| 168 | 100 | 100 | 100 | 80 | 100 | 100 | 100 | 100 | 93 | X |
| Author Average | 97 | 98 | 94 | 92 | 95 | 93 | 98 | 94 | 92 | 97 |

[a]nvq = no variable qualified.

EXAMPLE 3

Attribution of Authorship: Omission of Average Word Length

Variable Set 3 includes seven variables: four (NOM, PRED, COMP, MOD) are syntactic (related to phrasal type); three (NOM, PRED, COMP, MOD) are graphemic (related to punctuation) and one (AVGWL) is stylometric (average word length). This experiment was conducted using the variables of Variable Set 3, and omitting the average word length variable. The variable counts were extracted for each sentence for each author, and then summed for each document for each author.

Linear DFA was performed using SPSS, with the statistical model for each author pair built using document level data for the authors, with leave-one-out (LOO) cross-validation. The following SPSS options were selected: stepwise entry of variables, F set to 1.84 to enter and F set to 0.71 to remove variables, Mahalanobis distance and prior probabilities computed based on group size.

Table 19 shows the overall accuracy rate at 90.6% with the range from 83% to 98%.

TABLE 19

Cross-Validation Accuracy Scores for POS & Punctuation Variables (DFA done in forward stepwise mode)

| Author | 16 | 23 | 80 | 90 | 91 | 96 | 97 | 98 | 99 | 168 |
|---|---|---|---|---|---|---|---|---|---|---|
| 16 | X | 100 | 94 | 100 | 100 | 100 | 100 | 100 | 92 | 100 |
| 23 | 100 | X | 93 | 92 | 100 | 100 | 100 | 78 | 83 | 100 |
| 80 | 94 | 93 | X | 83 | 81 | 75 | 81 | 86 | 82 | 82 |
| 90 | 100 | 92 | 83 | X | 86 | 89 | 86 | 100 | 80 | 87 |
| 91 | 100 | 100 | 81 | 86 | X | 94 | 83 | 100 | 69 | 85 |
| 96 | 100 | 100 | 75 | 89 | 94 | X | 94 | 100 | 82 | 100 |
| 97 | 100 | 100 | 81 | 86 | 83 | 94 | X | 100 | 85 | 92 |
| 98 | 100 | 78 | 86 | 100 | 100 | 100 | 100 | X | 91 | 100 |
| 99 | 92 | 83 | 82 | 80 | 69 | 82 | 85 | 91 | X | 86 |
| 168 | 100 | 100 | 82 | 87 | 85 | 100 | 92 | 100 | 86 | X |
| Author Average | 98 | 94 | 84 | 89 | 87 | 93 | 91 | 95 | 83 | 92 |

EXAMPLE 4

Attribution of Authorship: Document Level Analysis; Nine Variables

Variable Set 7 includes nine variables, of which four (NOM, PRED, COMP, MOD) are syntactic (related to phrasal type); four (EOC, EOP, EOM, EMPH) are graphemic (related to punctuation); and one (AVGWL) is stylo-metric (average word length). The variable counts were extracted for each sentence for each author, and then summed for each document for each author.

Logistic regression analysis of the data was performed using SPSS. The statistical model for each author pair was built using document level data for the authors, but without cross-validation. The overall accuracy rate was 96%, with the overall results being in line with cross-validated results (although it is not standard procedure to use such small datasets without cross-validation).

As has been demonstrated, embodiments of the present invention deal with syntactic structures, an aspect of language that is not unique to any one language, but which is cross-linguistic, and thus, the parameters are applicable regardless of the language being used. Thus, embodiments of the present invention can be modified to provide authorship attribution in numerous languages, for example only, and not intended as a limitation, Arabic, Farsi, Fulani, Spanish or Turkish. Further, since embodiments of the present invention require far less textual data than other authorship attribution methods (as few as 100 sentences from any number of texts) authorship attribution using embodiments of the present invention can proceed rapidly, such that a security or investigative agency could work with 100 sentences, rather than having to delay until a large quantity of text (such as 100 texts) are obtained. Thus, embodiments of the present invention can aid in identifying a terrorist who, for example, has prepared a threatening statement, or who was overheard speaking by means of electronic surveillance and a transcript of the conversation generated.

Therefore, although this invention has been described with a certain degree of particularity, it is to be understood that the present disclosure has been made only by way of illustration, and that numerous changes in the details of construction and arrangement of components may be resorted to without departing from the spirit and scope of the invention.

REFERENCES

Baayen, H., van Halteran, H., Neijt, A., Tweedie, F. (2002). "An Experiment in Authorship Attribution." *Journees internationales d'Analyse statistique des Donnees Textuelles* 6.

Chaski, C. E. (1997). "Who Wrote It? Steps Toward A Science of Authorship Identification." *National Institute of Justice Journal:* 15-22.

Chaski, C. E. (2001). "Empirical Evaluations of Language-Based Author Identification Techniques." *Forensic Linguistics* 8(1): 1-65.

Chaski, C. E. (2004). "Recent Validation Results for the Syntactic Analysis Method for Author Identification." International Conference on Language and Law, Cardiff, Wales.

Hilton, O. (1993). *Scientific Examination of Questioned Documents*. Boca Raton, Fla., CRC Press.

Koppel, M, Schler, J. (2003). "Exploiting Stylistic Idiosyncrasies for Authorship Attribution", in *Proceedings of IJCA'03 Workshop on Computational Approaches to Style Analysis"*, Acapulco, Mexico.

Manning, C. D. and Schuetze, H. (1999). Foundations of Statistical Natural Language Processing. Cambridge, Mass.: MIT Press.

McMenamin, G. R. (2003). *Forensic Linguistics; Advances in Forensic Stylistics*. Boca Raton, Fla., CRC Press.

Miron, M. S. (1983). "Content Identification of Communication Origin." *Advances in Forensic Psychology and Psychiatry*. R. W. Reiber. Ed. Norwood, N.J., Ablex.

Mosteller, F., Wallace, D. L. (1984). *Applied Bayesian and Classical Inference: The Case of the Federalist Papers*. New York, Springer-Verlag.

Stamatatos, E., Fakotakis, N, Kokkinakis, G. (2000). "Automatic Text Categorization in Terms of Genre and Author." *Computational Linguistics* 26(4): 471-495.

Stamatatos, E., Fakotakis, N., Kokkinakis, G. (2001). "Computer-Based Authorship Attribution Without Lexical Measures." *Computers and the Humanities* 35: 193-214.

Tambouratzis, G., Markantonatou, S., Hairetakis, N., Vassiliou, M., Carayannis, G., Tambouratzis, D. (2004). "Discriminating the Registers and Styles in the Modern Greek Language—Part 2: Extending the feature Vector to Optimize Author Discrimination." *Literary & Linguistic Computing* 19(2): 221-242.

I claim:

1. A computer-aided method to determine whether an unidentified author of a textual work belongs to a group comprising the textual work of a known author, the method comprising the steps of:

obtaining a sample of the textual work of the unidentified author;

obtaining a sample of the textual work of the known author;

entering the samples into a computer system, the computer system including a memory, a means for analyzing documents, and a means for determining belonging, stored within the memory;

utilizing the means for analyzing documents, splitting the entered samples into individual sentences, the sentences each including a head, a plurality of words and punctuation, the punctuation defining a syntactic edge within the individual sentence, and graphemic features defining a discursive function emphatic selected from the group consisting of: bolding, italics, capitalization, emoticons and serial punctuation marks;

categorizing the punctuation by determining the syntactic edge;

indicating the discursive function emphatic, a graphemic feature being generated by the steps of categorizing and indicating;

dividing each of the individual sentences into the words;

labeling each of the words as a part of speech;

listing the labeled words into phrases for each labeled word;

identifying phrases for each said head;

classifying the identified phrases as marked or unmarked;

characterizing the identified phrases by markedness, thereby producing a plurality of syntactic features; and utilizing the means for determining belonging, inputting at least one of the syntactic features and inputting at least one feature selected from the group consisting of: (i) the graphemic features and (ii) the syntactic edges defined by punctuation; wherein the inputting is done for each said sample to determine whether the unidentified author of the textual work sample belongs to the known author group.

2. A system for determining whether an unidentified author of a textual work belongs to a group comprising the textual work of a known author, the system comprising:

a computer system including a memory, an input means, a means for analyzing documents, and a means for determining belonging, stored within the memory;

a sample of the textual work of the unidentified author;

a sample of the textual work of the known author, the samples being input into the computer system;

the means for analyzing documents splitting the entered samples into individual sentences, the sentences each including a head, a plurality of words and punctuation, the punctuation defining a syntactic edge within the individual sentences, and graphemic features defining a discursive function emphatic selected from the group consisting of: bolding, italics, capitalization, emoticons and serial punctuation marks;

the means for analyzing documents categorizing the punctuation by determining the syntactic edge; and indicating the discursive function emphatic, thereby generating a graphemic feature;

the means for analyzing documents dividing each of the individual sentences into the words; labeling each of the words as a part of speech; listing the labeled words into phrases for each labeled word, identifying phrases for each said head, classifying the identified phrases as marked or unmarked, characterizing the identified phrases by markedness, thereby producing a plurality of syntactic features; and inputting at least one of the syntactic features and inputting at least one feature selected from the group consisting of (i) the graphemic features and (ii) syntactic edges defined by punctuation; wherein the inputting is input into the means for determining belonging, thereby determining whether the unidentified author of the textual work sample belongs to the known author group.

* * * * *